March 17, 1936.   H. TREIBER   2,034,123
LIQUID HEATER
Filed Oct. 17, 1935
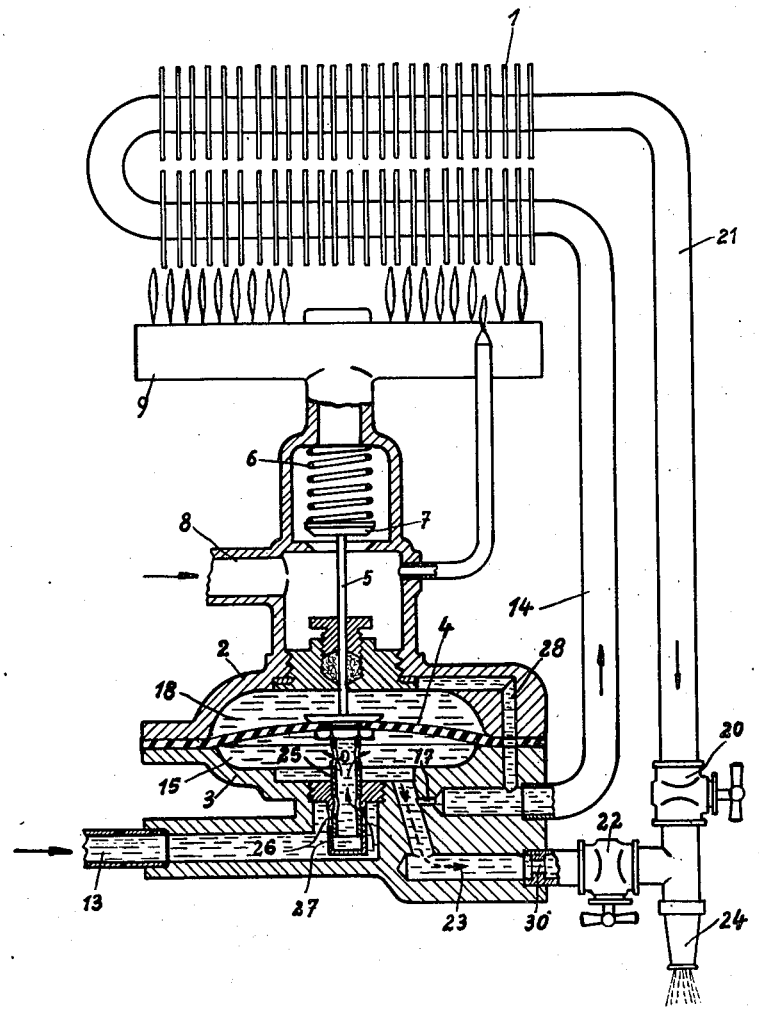
INVENTOR
HANS TREIBER
BY
ATTORNEY Patented Mar. 17, 1936

2,034,123

UNITED STATES PATENT OFFICE 2,034,123

LIQUID HEATER

Hans Treiber, Dessau, Germany, assignor to Junkers & Co. G. m. b. H., Dessau, Germany Application October 17, 1935, Serial No. 45,420
In Germany January 14, 1932

4 Claims. (Cl. 236—25)

This invention relates to a regulating system for water heaters of the type having a device whereby hot and cold water are mixed to provide a water supply at any desired temperature.

In such systems it is common practice to provide a flow control valve in the line between the water supply main and the heater for regulating the flow of water therethrough and thereby provide for a substantially constant temperature of the hot water entering the mixing device. Cold water entering this device has heretofore been supplied by a conduit connected with the water supply at a point in front of the control valve. This arrangement results in the disadvantage that even though the flow of hot water to the mixing device is substantially constant the mixture supplied by the mixing device cannot be maintained at constant temperature because variations of pressure in the supply line result in variations of the relative proportion of hot and cold water to the mixing device.

It is the principal object of this invention to eliminate the above mentioned difficulty. To this end the cold water supplied to the mixing device is obtained from a point between the control valve and the heater so that it is subject to regulation by the same member that controls the flow through the heater.

It is often desired to draw large quantities of cold water alone through the outlet from the mixing device. It is a further object of this invention to provide a structure in which the flow of hot water to the mixing device may be completely shut off without throttling the flow of cold water, in spite of the fact that the flow of cold water is throttled in proportion to the flow of hot water when the hot water valve is open.

These and other objects and features of the invention will in part be obvious to one skilled in the art and in part be set forth and more fully explained in the following detailed description taken in conjunction with the accompanying drawing which illustrates a preferred form of the invention with some parts in section and other parts in side elevation.

Referring to the drawing, the coil or other heating element of the liquid heater is indicated as a finned pipe 1. The control system for the heater includes a diaphragm housing having an upper part 2, a lower part 3 and a diaphragm 4 therebetween. As shown, the diaphragm 4 acting through stem 5 against spring 6 is adapted to actuate the gas valve 7 which controls the flow of gas from a conduit 8 to a burner 9. A sleeve valve 25 is connected with the opposite side of diaphragm 4 and is adjustable to more or less restrict the openings 26 in a stationary shell 27.

A conduit 14 having a restricted entrance 17 connects the lower diaphragm chamber 15 to the heater 1. A valve 20 in pipe 21 controls the flow of hot water from the heater 1 to the mixing device, the outlet from which is indicated at 24. A cold water conduit 23 regulated by cock 22 is also connected to the diaphragm chamber 15. For convenience the conduits 14 and 23 may branch off from a single conduit opening into the lower diaphragm chamber as shown. It will be understood that the conduits 14 and 23 may open into the lower diaphragm chamber through separate passages, it being important however that flow of liquid from the diaphragm chamber 15 through conduit 14 be restricted as at 17 while the flow from the diaphragm chamber through the conduit 23 be relatively unrestricted or only slightly restricted as at 30. Where the conduit 23 branches off from the conduit 14 it is important that the former branch off from a point in front of the restriction 17, rather than from a point behind the same. The upper diaphragm 18 is connected by a passage to the conduit 14 in back of the restriction 17 as shown.

The system operates as follows:

Upon opening the hot water cock 20, cold water flows through pipe 13, the openings 26, and thence through the hollow sleeve 25 into the lower diaphragm chamber 15. From there the water flows through contraction 17 and branch conduit 14 into the heater, and thence through conduit 21 to outlet 24. The difference in water pressure on the two sides of contraction 17 is transferred to the diaphragm 4 in such manner that its underside is subjected to the greater pressure, which causes the diaphragm to flex upwardly. This flexing of the diaphragm adjusts the sleeve valve 25 in such manner that, as soon as the pressure difference effective on the diaphragm exceeds a predetermined amount the water is throttled at openings 26 to such an extent that the pressure difference effective on the diaphragm is maintained constant at a value depending on the load applied by spring 6 to the diaphragm. Therefore, a predetermined quantity of water flows through branch 14 and is heated to the desired temperature in the heater 1. If the cold water cock 22 is open also, then, so long as the hot water cock 20 is open, only a limited amount of cold water can be obtained. This limited quantity is sufficient for heating purposes but cannot exceed the capacity of the heater to deliver water at a predetermined temperature.

As shown the gas valve 7 is also opened by the upward flexing of the diaphragm 4 thus insuring the operation of the burner 9 upon opening of the cock 20. Obviously any means for opening the gas valve 7 simultaneously with the opening of the cock 20 may be utilized. The arrangement shown, however, is preferred, it being simple, compact and avoiding complicated mechanism. The burner 9 will of course be of such capacity as to supply sufficient heat to the water permitted to pass through conduit 14 to heat this water to the highest desired temperature.

Since the flow of water through the heater does not vary materially the heater 1 and the burner 9 may be correlated to function at a high efficiency and at temperatures which avoid condensation. The burner and heater therefore either operate under the most favorable conditions or are entirely out of operation.

In order to prevent, upon opening of the cock 22, water from flowing exclusively through branch 23, whereby no pressure difference would be produced at the diaphragm and the gas valve 7 would be closed, a contraction 30 is provided in branch 23, the cross section of which may be considerably larger than that of the contraction 17. If the hot water cock 20 is closed, there is no more pressure difference at contraction 17, the diaphragm 4 moves downwardly under the influence of spring 6, and the openings 26 of the guide shell 27 are entirely uncovered by means of sleeve valve 25, so that then cold water may be obtained in large quantities over cock 22.

It will be seen that the structure herein disclosed provides a system wherein the proportion of hot and cold water supplied to a mixing device may be maintained constant for any given setting of the valves, thereby maintaining the water discharged from the outlet of the device at constant temperature. It will further be seen that the cold water may be completely shut off without affecting the flow of hot water through the heater so that water at maximum temperature may be drawn from the mixing device. Similarly cold water alone may be drawn from the mixing device while the hot water is completely shut off, and furthermore the device may be set to supply water at any desired temperature between these extremes and when so set the temperature will remain constant regardless of variations in pressure of the supply source.

While there is herein described a single embodiment of the invention other embodiments within the scope of the appended claims will be obvious to those skilled in the art.

Having thus described the invention what is claimed as new is:

1. A system for regulating the flow of hot and cold water to a hot and cold water mixing means, including a source of water supply, a regulating device for automatically controlling the flow from said source, a liquid heater, means for conducting water from said regulating device through said heater and thence to said mixing means to supply hot water thereto, and means to conduct water directly from said regulating device to said mixing means to supply cold water thereto, whereby said control device regulates the flow of both the hot water and the cold water to said mixing means to maintain the relative proportions thereof constant for any given setting thereof.

2. A system for regulating the flow of hot and cold water to a hot and cold water mixing means, including a source of supply, a regulating device for automatically controlling the flow from said source, a liquid heater, means for conducting water from said regulating device to said heater, a connection between said heater and said mixing means, a hot water cock controlling said connection, said regulating device operating to maintain the flow of water through said heater constant when said cock is open, a connection between said regulating device and said mixing means for supplying cold water to the latter, a cold water cock controlling said connection and means whereby said regulating device throttles the flow of cold water to said mixing means when both said cocks are open, while permitting unrestricted flow of cold water through said cold water cock when said hot water cock is closed.

3. A system for regulating the flow of hot and cold water to a hot and cold water mixing means, including a hot water supply, a cold water supply, separate cocks for controlling the flow of hot and cold water from said supplies to said mixing device, and a common valve for controlling the flow of both hot water and cold water to said mixing means, said common valve operating to maintain a constant flow of hot water to said mixing means when said hot water cock is open, to restrict the flow of cold water when both said cocks are open, and to permit unrestricted flow of cold water when said cold water cock alone is open.

4. A liquid heating and mixing system including a source of liquid supply, a liquid heater, a connection between said heater and said source, a valve for maintaining the flow of liquid through said connection constant regardless of variations in pressure at said source, a restriction in said connection between said heater and said valve, a mixing device, and connections for supplying hot water from said heater to said mixing device, and a cold water conduit connected to said mixing device, said cold water conduit branching off from said conduit leading to said heater at a point between said restriction and said valve..

HANS TREIBER.